(No Model.)
P. LAMBERT.
METHOD OF AND APPARATUS FOR THE DESTRUCTION OF PHYLLOXERA
No. 261,558. Patented July 25, 1882.
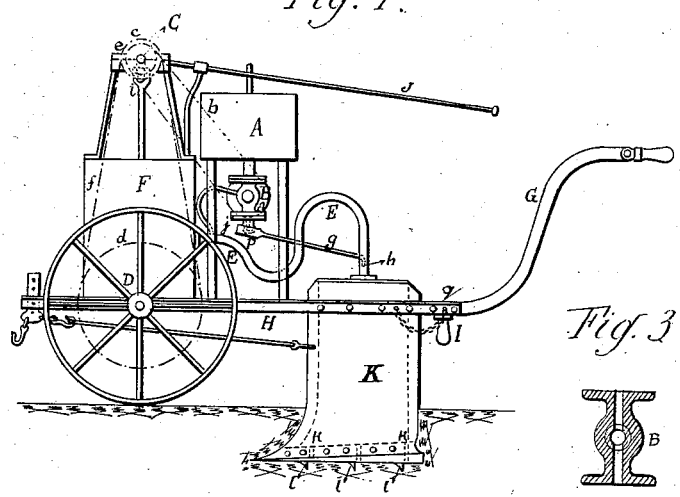
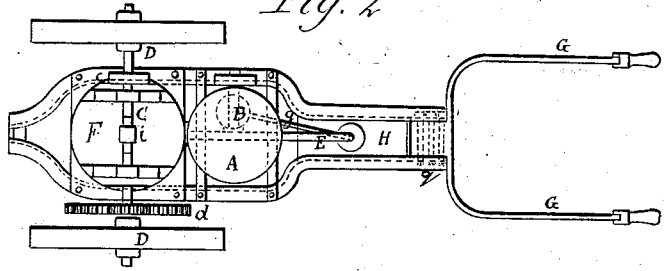
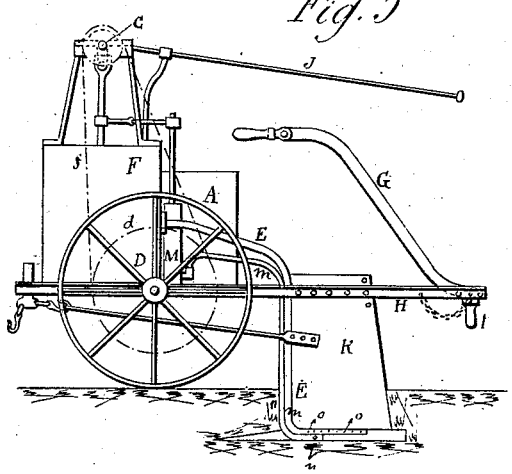
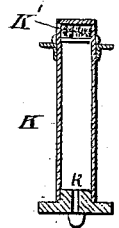
WITNESSES:
E. B. Bolton
Geo. Bainton
INVENTOR:
Paul Lambert
By his attorneys,
Burke, Fraser & Connett

United States Patent Office.

PAUL LAMBERT, OF PARIS, FRANCE, ASSIGNOR TO THE SOCIETY "LA RECONSTITUTION VITICOLE," OF SAME PLACE.

METHOD OF AND APPARATUS FOR THE DESTRUCTION OF PHYLLOXERA.

SPECIFICATION forming part of Letters Patent No. 261,558, dated July 25, 1882.

Application filed January 20, 1882. (No model.) Patented in France July 30, 1879, No. 132,027.

*To all whom it may concern:*

Be it known that I, PAUL LAMBERT, a citizen of the French Republic, residing in Paris, France, have invented certain Improvements in Means for the Destruction of Phylloxera, of which the following is a specification.

The object of my invention is the treatment of vines for the destruction of phylloxera, and for imparting new life to the injured plants. It consists in injecting a spray or vapor of bisulphide of carbon into the earth near the plants, and also in a machine for accomplishing this injection.

The accompanying drawings show my machine.

Figure 1 is a side elevation. Fig. 2 is a plan. Fig. 3 is a fragmentary detail view. Fig. 4 is a vertical cross-section of the plowshare, and Fig. 5 is a side elevation of a modified form of the machine.

Referring to Figs. 1 to 4, A is the reservoir in which the bisulphide of carbon is placed. Below it is a cock, B, (shown in section in Fig. 3,) which is continually rotated during the progress of the machine by a pulley, $a$, connected to it, which is driven by a belt, $b$, from a pulley, $c$, fixed on the shaft C. This shaft has another pulley, $e$, fixed to it, and is driven by a belt, $f$, connecting that pulley to a pulley, $d$, on the axle or on one of the driving-wheels. The rotation of the cock B causes the liquid to flow from the reservoir intermittently, thus limiting the flow to the amount required. The liquid falls into a diffusing-pocket, $p$, and flows out thence by a small pipe, $g$, which terminates in an air-blast pipe, E, its end being bent downward, as shown at $h$.

F is an air-pump or bellows driven by a crank or eccentric, $i$, on the shaft C, and forcing a strong blast of air through the pipe E, from which pipe a small branch pipe, $j$, leads to the cock B. The blast of air from this pipe $j$ serves to accelerate the flow of liquid from the valve B and through the pipe $g$, as well as to facilitate its spraying. The pipe E leads to a hollow plowshare, K, which penetrates the ground in much the same manner as the share of an ordinary plow. In this share is an upper compartment, K', filled with coke, and through the bottom of the share are several holes, $k$, which are protected from being filled with earth by a shield, $l$, in front of each hole.

The machine is designed to be drawn through the earth in the same manner as a plow, and guided by handles G, connected to its frame H by a pin, $q$, so that if cramped for room they may be turned back, as denoted in Fig. 5, and the machine guided by the small handles I.

The air-blast in the pipe E acts as a vaporizer on the liquid entering through the small pipe end $h$. It sprays or vaporizes the liquid, and the latter in passing through the coke in K' is still further subdivided, and eventually escapes through the holes $k$ $k$ into the earth. The quantity of liquid used may be regulated by a brake on the shaft C, thrown into operation by a lever, J, which projects to within the operator's reach.

In Fig. 5 the tank A is shown lower down, and a pump, M, takes the place of the cock B, being likewise driven from the shaft C. The pump sends an intermittent stream of liquid through the pipe $m$ down alongside the share K, and discharges it at an orifice, $n$, where the jets of air blowing from the perforations $o$ $o$ in the pipe E, which also extends down to the share, vaporize or spray the liquid and drive it into the earth.

A jet of steam may be substituted for the air-blast, in which case a boiler will be substituted for the pump F.

I am aware that steam has been driven into the ground through perforations in a plowshare, and make no claim thereto, except when the blast of steam serves as a vehicle for a vapor of bisulphide of carbon.

At the same time with this treatment of the vines I also by preference employ some fertilizer which furnishes to the plants the necessary nutritive material to enable them to recover from the ravages of the phylloxera.

I am aware that liquid sulphuret of carbon has been poured into holes punched in the ground around the roots of vines to destroy phylloxera, and make no claim to such use of this substance. To be effective the liquid must be reduced to spray or vapor, the earth must be stirred up and prepared for its reception, and it must be forced into the earth by a gaseous blast.

I claim as my invention—

1. The improved process for the destruction of phylloxera, which consists in injecting into the soil carbon bisulphide sprayed or vaporized by a jet or blast of air or steam, substantially as set forth.

2. An apparatus for destroying phylloxera, which consists of a plow, a reservoir for the destructive liquid, a pipe for conveying said liquid to the plowshare, and means for developing a gaseous blast and directing it upon said liquid in such manner as to spray it and drive it into the earth, substantially as set forth.

3. The combination of a plow, a reservoir for the destructive liquid, a pipe leading therefrom, an intermittently-opening cock or its specified equivalent supplying said pipe, an air-pump or bellows, and a blast-pipe leading therefrom, joining the pipe conveying the liquid, arranged to spray the liquid as it emerges from the said pipe and to convey it into the earth, substantially as set forth.

4. The combination of the reservoir A, cock B, pipe $g$, pump F, blast-pipe E, and hollow share K, having perforations $k\,k$, substantially as and for the purposes set forth.

5. The combination of revolving shaft C, pump F, driven therefrom, cock B, or its specified equivalent, also driven from said shaft, reservoir A, pipes $g$ and E, plowshare K, and brake J, substantially as set forth.

6. The combination of reservoir A, cock B, pipe $g$, air-pump F, pipe E, branch pipe $j$, and hollow share K, substantially as set forth.

In witness whereof I have hereunto signed my name in the presence of two subscribing witnesses.

PAUL LAMBERT.

Witnesses:
CHARLES MARDELET,
SYLVAIN GUTMACHER.